(12) United States Patent
Gionis et al.

(10) Patent No.: US 8,346,686 B2
(45) Date of Patent: Jan. 1, 2013

(54) TAXONOMY-DRIVEN LUMPING FOR SEQUENCE MINING

(75) Inventors: Aristides Gionis, Barcelona (ES); Francesco Bonchi, Barcelona (ES); Debora Donato, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 678 days.

(21) Appl. No.: 12/534,706

(22) Filed: Aug. 3, 2009

(65) Prior Publication Data

US 2011/0029475 A1 Feb. 3, 2011

(51) Int. Cl.
*G06F 15/18* (2006.01)
(52) U.S. Cl. .............................. 706/12; 706/45; 707/771
(58) Field of Classification Search .................... 706/12, 706/45; 707/771
See application file for complete search history.

(56) References Cited

OTHER PUBLICATIONS

Bonchi et al ("Taxonomy-driven lumping for sequence mining" published online: Jul. 21, 2009, Springer Science).*
Marcelo Gabriel Mendoza Rocha ("Query Log Mining in Search Engines" Jun. 2007).*
Paolo Boldi et al ("The Query-flow Graph: Model and Applications" Oct. 2008).*
Chuang et al ("Towards Automatic Generation of Query Taxonomy: A Hierarchical Query Clustering Approach" 2002).*
Langford B. White ("Lumpable Hidden Markov Models—Model Reduction and Reduced Complexity Filtering" Dec. 2000).*
Rachel Mackay ("Hidden Markov Models: Multiple Processes and Model Selection" Jun. 2003).*
Bonchi, Francesco et al., "Taxonomy-driven lumping for sequence mining," Data Mining and Knowledge Discovery, Oct. 2009, vol. 19, No. 2, pp. 227-244.

* cited by examiner

*Primary Examiner* — Lut Wong
(74) *Attorney, Agent, or Firm* — Weaver Austin Villeneuve and Sampson LLP

(57) ABSTRACT

Methods and apparatus are described for modeling sequences of events with Markov models whose states correspond to nodes in a provided taxonomy. Each state represents the events in the subtree under the corresponding node. By lumping observed events into states that correspond to internal nodes in the taxonomy, more compact models are achieved that are easier to understand and visualize, at the expense of a decrease in the data likelihood. The decision for selecting the best model is taken on the basis of two competing goals: maximizing the data likelihood, while minimizing the model complexity (i.e., the number of states).

20 Claims, 4 Drawing Sheets

TAXONOMY-DRIVEN LUMPING FOR SEQUENCE MINING

BACKGROUND OF THE INVENTION

The present invention relates to data mining, and more specifically to modeling sequences of events arranged in a taxonomy.

Markov models are fundamental mathematical structures widely used in the natural and physical sciences, computer science, and engineering systems for describing and predicting processes. A Hidden Markov Model (HMM) is an extension of a Markov chain in which observable symbols are emitted in each of the states, but it is not possible to know exactly the current state from the symbol observed. Markov models with or without hidden states, first-order or higher-order, with or without lumping of states, have been extensively applied to sequence mining in the past.

The HMM parameters of a model can be adjusted by the well-known Baum-Welch method to increase the likelihood of observed sequences of symbols. Another class of techniques for learning HMM parameters from data is based on model merging. These approaches start with a maximum likelihood HMM that directly encodes all the observable samples. At each step, more general models are produced by merging previous simpler submodels. The submodel space is explored using a greedy search strategy and the states to be merged are chosen to maximize the data likelihood.

State aggregation in Markov models. Many of the processes that can be represented by HMMs suffer from the state space explosion problem. State space explosion occurs when the number of states grows too quickly for computation to solve more than trivial cases. As the number of states rapidly increases, computers run out of time and/or memory to complete the computation. For example, problems that grow exponentially or combinatorially with the size of the input suffer from state space explosion. As a result, minimizing memory requirements and time is crucial for most applications of HMMs. Aggregation techniques for reducing the number of states have been extensively studied.

Many approaches are based on the notion of lumpability, a property of Markov chains for which there exists a partition of the original state space into aggregated states such that the aggregated Markov chain maintains the characteristics of the original. A different approach reduces the structure of an HMM by partitioning the states using the bi-simulation equivalence, so that equivalent states can be aggregated in order to obtain a minimal set that does not significantly affect model performance. A simple heuristic for HMMs is to merge states that have the most similar emission probabilities. This approach has been applied to the domain of gesture recognition.

Sequence clustering. Sequence clustering is one of the most common tasks in sequence mining. This task has been handled by using frequent subsequences or n-grams statistics as features or considering the edit distances among all the candidate sequences. Traditional methods often require sequence alignment and do not efficiently handle variable-length sequences.

One of the first works using HMM for sequence clustering computed the pairwise distance matrix for all the observed sequences by training an HMM for each sequence. The log-likelihood of each model given the sequence is used to cluster the sequences in K clusters using an Expectation-Maximization (EM) algorithm. A Markov-chain based cluster method without hidden states using EM has also been implemented in commercial applications. In another approach, the HMMs are used as cluster prototypes. The clustering is computed by a combined approach of the HMMs and a rival-penalized competitive learning procedures. In an extension to the pairwise distance approach, HMMs are used to build a new representative space, where the features are the log-likelihoods of each sequence to be clustered with respect to a predefined number of HMMs trained over a set of reference sequences.

Sequence clustering can also be used for probabilistic user behavior models to describe and predict user actions. User actions are described by the conditional probability of performing an action given the previous action, plus binary features that indicate the presence of a certain action in the user's history.

Sequence mining applications. There are many applications of sequence mining. Two areas of interest are web usage mining and spatio-temporal data mining. Sequential pattern mining is one of the most common data mining techniques for Web data analysis. Markov models have been applied for modeling user web navigation sessions, describing user behavior, mining web access logs and for query recommendation. Mobility data analysis is a research area rapidly gaining a great deal of attention, as witnessed by the amount of spatio-temporal data mining techniques that have been developed in the last years.

Non-Markov based methods are also known in the art. Taxonomy-driven data mining has been mainly considered in the context of frequent pattern extraction: originally taxonomies were used for mining association rules and sequential patterns of itemsets in market-based data, where each item is a member of a hierarchy of product categories. More recently, taxonomy-based methods were used for mining frequent-subgraph patterns in biological pathways, where graphs of interacting proteins annotated with functionality concepts form a very large taxonomy.

SUMMARY OF THE INVENTION

According to the present invention, methods and apparatus are presented for modeling event data on a computer. The event data comprise sequences of symbols or events each representing an order of actions taken by a user. Events are grouped into a taxonomy which can be represented as a hierarchy or tree on the data, with each event mapping to a leaf node in the tree. A plurality of candidate Markov models are identified representing the probability of a user transitioning from a first node in the tree to any second node. Each Markov model comprises a subset of nodes in the taxonomy. Markov models are formed such that every event is represented by its corresponding leaf node or an ancestor node in the tree. Further, no Markov model contains both a node and an ancestor of that node. Additional Markov models are generated by merging selected nodes in the taxonomy into a corresponding ancestor node to limit the search space. The fitness of the candidate Markov models is measured with a fitness policy. Some of the candidate Markov models are selected with reference to the fitness measure and one or more resource constraints. A preferred Markov model is chosen according to an objective function balancing desired characteristics.

According to further embodiments, the event data are partitioned into multiple clusters. Each cluster is assigned a Markov model using the described process. These clusters are iteratively adjusted by reassigning each event sequence to the cluster whose preferred Markov Model maximizes the objective function for that sequence. In some embodiments, the event data may comprise search queries submitted to a search engine, purchases on an online commerce site, locations on a map, pages visited on one or more websites, or user interactions with a software system. Advertisements may be selected for and displayed to a user based on a probability represented by a preferred Markov model.

A further understanding of the nature and advantages of the present invention may be realized by reference to the remaining portions of the specification and the drawings.

DETAILED DESCRIPTION OF SPECIFIC EMBODIMENTS

Figure 1:
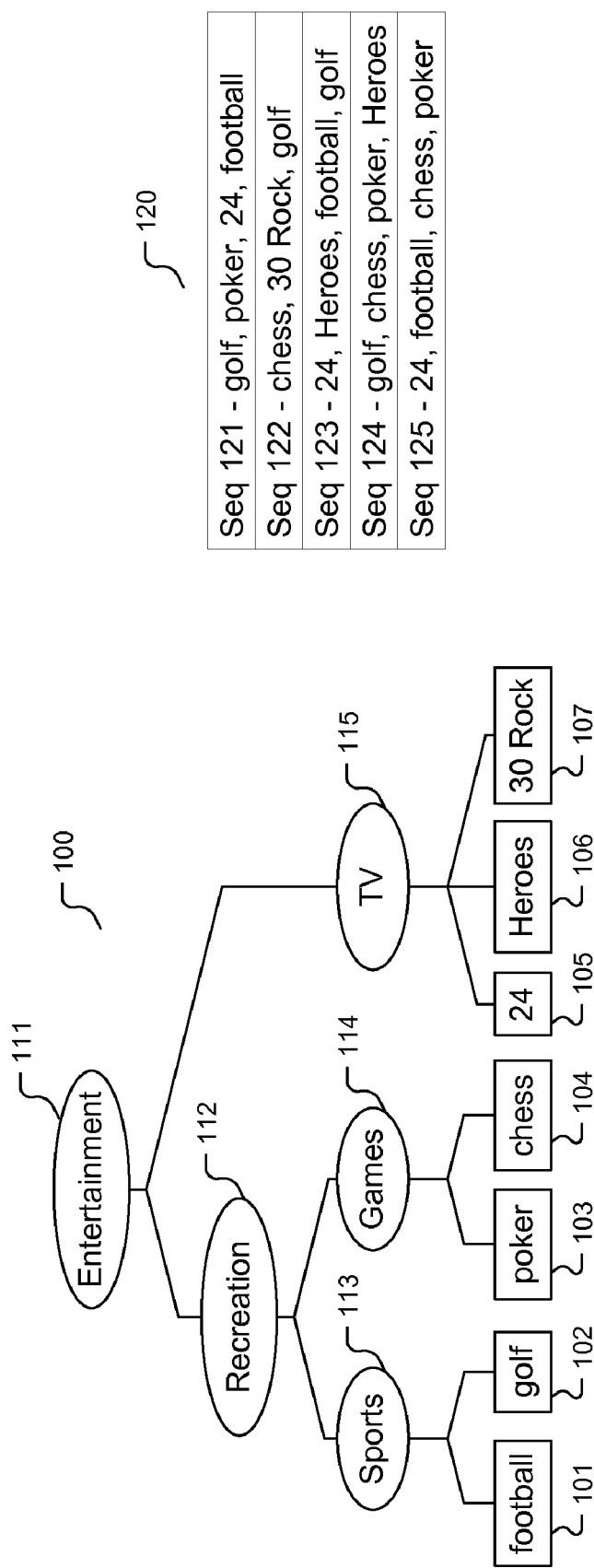
FIG. 1 depicts an example problem domain where embodiments of the invention may be practiced.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Many real-world application domains are equipped with hierarchically-organized ontologies or taxonomies. The term "taxonomy" herein refers to any such hierarchical classification or grouping of elements. For example, the Linnaean taxonomy of organisms arranges species into hierarchical categories including kingdom, phylum, class, order, family, and genus. Often a taxonomy can be expressed as a tree. Taxonomies are useful for modeling data in such domains for at least two reasons. First, more compact, meaningful and understandable abstractions of the data can be produced by presenting it in terms of more general nodes in the taxonomy. Second, taxonomies can constrain the search space of datamining algorithms, allowing more efficient and scalable techniques to be devised.

According to various embodiments of the present invention, sequences are modeled with Markov models whose states correspond to nodes in a provided taxonomy. Each state represents the events in the subtree under the corresponding node. By lumping observed events into states that correspond to internal nodes in the taxonomy, more compact models are achieved that are easier to understand and visualize, at the expense of a decrease in the data likelihood. The decision for selecting the best model is taken on the basis of two competing goals: maximizing the data likelihood, while minimizing the model complexity (i.e., the number of states).

The problem is formally defined and characterized, and a search method is given for finding a good trade-off among the two aforementioned goals. Unlike previous approaches, this approach introduces a natural constraint and leads to an efficient algorithmic solution.

The problem addressed herein can be distinguished from previous efforts. Given a set of events (or symbols, or items), a taxonomy tree on those events, and a dataset of event sequences, we study the problem of finding efficient and effective ways of producing a compact representation of the sequences. This representation is also used to cluster the sequences. It is worth noting the different perspective herein: in the present context, states aggregation or abstraction is done for the sake of useful and actionable knowledge modeling, and not only for reducing computational requirements.

According to embodiments of the present invention, the initial model is built starting from the relative frequencies of each sample, yielding a maximum likelihood model for the data. This model differs from previous approaches in two fundamental aspects due to the hierarchical structure of the input symbols. First of all, the natural constraints imposed by the data allow inferring the states directly from the emitted symbols, with the correspondent advantage of not having hidden states. Thus, it is worth noting that the model is not a Hidden Markov Model, avoiding downsides of that approach. Moreover, since the greedy search employed is "guided" by a hierarchical structure, two states can be merged only if they have the same parent in the taxonomy. In this way, the hierarchy based merging drastically reduces the search space. In addition, instead of exploring all possible models, adjacent models are tested in each iteration.

Many different application domains fit within the described framework: in general, any problem regarding user (or customer) profiling, where the set of possible actions is hierarchically structured in a taxonomy. FIG. 1 depicts one example of such a domain. Taxonomy 100 includes search queries 101-107 arranged in a hierarchy of categories 111-115. Each query represents a search term entered by a user into a search engine such as Yahoo! Search. In this example, users have searched for pages on football, golf, poker, chess, 24, Heroes, and 30 Rock. Each term has been assigned to a category: Sports (football, golf), Games (poker, chess), and TV (24, Heroes, 30 Rock). These categories are in turn arranged into a hierarchy of further categories, with Sports and Games being grouped together under Recreation, which is grouped with TV under Entertainment. The data is depicted as a tree to illustrate these relationships. This depiction is largely conceptual; in practice, the data may be stored in any number of ways, including but not limited to trees, lists, arrays, tables, maps, and databases. For example, a sparse-matrix representation could be used for the sequence data. Further, taxonomies having any number of branches or levels, balanced or unbalanced, are contemplated by the invention.

In addition to a taxonomy, embodiments of the invention use Markov models to model transitions between states. These transitions are derived from a sequence of events. Sequence data 120 comprises sequences 121-125 of search terms entered by users. Each sequence contains search terms entered by a particular user in a particular order. For example, in sequence 124, the user first searched for the term "golf", followed at a later time by a search for the term "chess", and subsequently the terms "poker" and "Heroes". While sequence 124 contains four search terms, in general a sequence may be any length. Similarly, any number of sequences may be used, not just the five sequences shown.

As another example, consider a large web site containing different pages and providing different services. The web site owner may be interested in profiling users with respect to their activity inside the site, for understanding which services and which parts of the site appear to be sequentially connected by users' activities. Events for the model would be the individual pages or services of the site which the users access. Each sequence would be the order in which a particular user visited those pages or services. The taxonomy could be the path hierarchy for the URLs visited.

As yet another example, consider the interaction between a software system (such as Yahoo! Messenger) and its users. The software system may record user activities, and then the software developers may want to analyze these activity traces in order to understand how users interact with the system and how to improve it. The possible user actions are commands which are naturally organized in a hierarchy, e.g. in the different toolbars and menus of the software system.

As a final example, embodiments of the invention can be applied to model trajectories on a map. A trajectory in this context is a sequence of locations visited. It may be represented as discrete points corresponding to individual locations (e.g. gas station, grocery store, home, etc) or a continuous line along the route traveled, among other possibilities. The map may represent a physical location such as the San Francisco Bay Area, the city of Oldenburg, or the solar system. It may also map virtual, logical, or fictional locations, such as a map of the internet, a social networking service, or Gotham City.

According to certain embodiment, sequences may be obtained from trajectories by dividing the map into a grid. Each square in the grid represents one event or symbol for the model, and each trajectory defines a sequence of grid squares visited. To create a hierarchy over the points, a tree is created by taking an area covering the whole map as the root, and then recursively dividing this area until the full grid is reached. For example, a 32×32 grid creates a tree with 1,024 leaves, one for each grid square. A taxonomy is created by dividing the root node (i.e. the entire map) into quadrants, and then recursively dividing each section into quadrants until the 32×32 grid is reached. This produces a taxonomy of six levels.

Contexts in which the framework is useful include two applications described herein: (i) query log mining, where user queries are classified in a topical taxonomy, and (ii) mining trajectories of moving objects, where the hierarchy is given by the natural spatial proximity. In all of the above-mentioned applications, automatically defining the most appropriate level of granularity to represent the information is challenging.

According to the present invention, the modeling representation adopted for a collection of sequences is a Markov model. The states of the model are nodes in the taxonomy, where the last level (leaves) contains the observable symbols corresponding to events. Upon visiting each state, the Markov model emits one symbol, which can be any leaf in the sub-tree under the node corresponding to that state. Although this model involves transitions and emissions, the model is not a Hidden Markov Model. That is, due to the one-to-many mapping from states to symbols in the model, we can always recover exactly the state that emits each symbol. There are no truly hidden states.

By using internal nodes in the taxonomy tree to represent the Markov states, the likelihood of the data given the model is decreased with respect to a model created at the leaf level. The higher we go in the taxonomy, the more the likelihood decreases, but the greater the simplicity of the obtained models. This helps make the models more general, more meaningful for the domain experts, and easier to visualize. The decision between alternative models is based on the following competing criteria: (i) the data likelihood should be maximal, and (ii) the model complexity should be minimal.

The approach of using (non-hidden) Markov states to represent disjoint subsets of symbols is inspired by the fundamental ideas of lumpability and approximate lumpability in Markov chains. In addition to lumping, the emission probabilities of the symbols at the lumped states are used to express the total likelihood of the data. Since the model does not have hidden states, we can bypass the computational challenges of HMMs, such as the estimation of model parameters using the Baum-Welch algorithm. In the present model, the parameters that yield the maximum likelihood are given by simple frequency counts. The computation of the likelihood of a sequence given a model is also done by counting, and not by using a sequence decoder such as the Viterbi algorithm.

A further advantage of Markov models is that they can be directly used for visualization of the mining results. For instance, in a trajectory clustering application, the nodes of the Markov model can be laid directly over the geographic map, to represent areas with the associated transition probabilities among them.

Once a Markov model is chosen to represent the data, the probability information it provides can be used for a variety of purposes. For instance, the model may predict that a user visiting a search term in a category Sports has a 70% chance of next searching for a term in a category Games. This prediction can be used to present relevant information to the user, such as displaying ads for poker websites to a user entering the search term "football".

The following mathematical notation will be used to further describe certain aspects of the invention. The data to be modeled can be denoted as a set of r sequences $\mathcal{D} = \{\sigma_1, \ldots, \sigma_r\}$ over a set of m>2 symbols $\Sigma = \{\alpha_1, \ldots, \alpha_m\}$. A special meaning is assigned to two of the symbols of $\Sigma$, namely, $\alpha_1 = \triangleright$ denotes the starting symbol and $\alpha_m = \square$ denotes the terminal symbol. The first symbol of all sequences is the starting symbol ($\alpha_{j1} = \triangleright$). The last symbol of all sequences is the terminal symbol ($\alpha_{j1_j} = \square$). No other symbol is either starting or terminal. The symbols of $\Sigma$ form a taxonomy T, which is simply a tree whose leaf nodes is the set $\Sigma$.

For any symbol $\alpha \in \Sigma$, let $c_\alpha$ denote the total number of times that $\alpha$ appears in all sequences. Hence $c_\triangleright = c_\square = r$ because there are r sequences and every sequence begins and ends with the starting and terminal symbols, respectively. This notation is extended by using $c_{\alpha\beta}$ to denote the total number of times that symbol $\beta$ follows symbol $\alpha$ in all sequences.

Consider a set of s states $X = \{x_1, \ldots, x_s\}$. A Markov model on X is defined by transitional probabilities $p_{x,y}$, for each pair of states x,y$\in$X, which determine the probability that the next state will be y given that the current state is x. For all x$\in$X, it holds that $\Sigma_{y \in X} p_{x,y} = 1$.

Embodiments of the invention utilize a Markov model M with s>2 states $X = \{x_1, \ldots, x_s\}$, where each state x$\in$X corresponds to a set of symbols $A(x) \subseteq \Sigma$. Further, $\{A(x)\}$ forms a partition of $\Sigma$. In mathematical terms, this means that $\cup_{x \in X} A(x) = \Sigma$ and $A(x) \cap A(y) = \emptyset$ for all x,y$\in$x. This partition will be in practice a cut in the taxonomy tree. The cut ensures that each state is represented by a single node from the taxonomy in the Markov model. For any given node in the Markov Model, no ancestor nodes in the taxonomy will appear in the partition (because the A(x) sets are disjoint) or the resulting Markov model.

The states $x_1$ and $x_s$ are special states used for denoting the starting and terminal symbols. No other symbols are assigned to those states. Hence $A(x_1) = \{\triangleright\}$ and $A(x_8) = \{\square\}$. Conversely, for a symbol $\alpha$ let $x(\alpha)$ denote the unique state to which $\alpha$ is assigned, i.e. $\alpha \in A(x(\alpha))$. To give correct interpretation to the starting state $x_1$ and the terminal state $x_x$, we assume that for all $x \in X$, $p_{x,x1}=0$, $p_{x1,xs}=0$, and $p_{xs,xs}=1$.

For understanding certain aspects of the invention, a Markov model is denoted by $M=(X, A, p, q)$, where $X$ is the set of states, $A$ is the function mapping states to sets of symbols, and where $p$ and $q$ are the vectors containing all the transition and emission probabilities, respectively.

Describing the Markov model in terms of transition and emission probabilities evokes comparisons to a hidden Markov model. However, as previously mentioned, since each symbol in our model corresponds to a unique state, there are no hidden states. Given a Markov model $M=(X, A, p, q)$ as described above, another Markov model can be defined $M'=(\Sigma, r)$, whose set of states is the set of symbols $\Sigma$. $M$ and $M'$ are equivalent, and $M'$ is a proper first-order Markov model with no hidden states.

Lemma 1. Given a model $M=(X,A,p,q)$ with transition and emission probabilities there is an equivalent Markov model $M'=(\Sigma, r)$ with no hidden states, where $$r_{\alpha,\beta}=p_{x(\alpha),x(\beta)}q_{x(\beta),\beta}.$$

Likelihood of a dataset. Given a dataset of sequences $\mathcal{D}=\{\sigma_1, \ldots, \sigma_r\}$, and a Markov model $M=(X,A, p, q)$, the likelihood of the data given the model is computed as $$L(\mathcal{D} \mid \mathcal{M}) = \prod_{\alpha,\beta \in \Sigma} (p_{x(\alpha),x(\beta)})^{c_{\alpha\beta}} \prod_{\alpha \in \Sigma} (q_{x(\alpha),\alpha})^{c_\alpha}$$

The first product is due to transitions among states, and the second product is due to emissions of symbols. To avoid numerical underflow it is convenient to work with the minus log-likelihood, which is $$S_L(\mathcal{D} \mid \mathcal{M}) = -\sum_{\alpha,\beta \in \Sigma} c_{\alpha\beta} \log p_{x(\alpha), x(\beta)} - \sum_{\alpha \in \Sigma} c_\alpha \log q_{x(\alpha),\alpha} \quad (1)$$

Maximum-likelihood estimation. Consider the input sequences $\mathcal{D}=\{\sigma_1, \ldots, \sigma_r\}$ and a Markov model $M$ in which only the states $X$ and the state-to-symbol mapping $A$ have been specified. The task is to compute the transition and emission probabilities, $p$ and $q$, so that the $S_L(\mathcal{D} \mid \mathcal{M})$ function is minimized. It is well known that the maximum-likelihood probabilities are estimated as the observed frequencies $$\overline{p}_{x,y} = \frac{c_{xy}}{c_x} \quad (2)$$

and $$\overline{q}_{x,\alpha} = \begin{cases} c_\alpha/c_x & \text{if } \alpha \in A(x) \text{ and} \\ 0 & \text{otherwise,} \end{cases} \quad (3)$$

where $c_{xy}=\sum_{\alpha \in A(x); \beta \in A(y)} c_{\alpha\beta}$ is the total number of times that a symbol of state $x$ is followed by a symbol of state $y$, and $c_x=\sum_{\alpha \in A(x)} c_\alpha$ is the total number of times that a symbol of state $x$ appears in the data. This leads to the following.

Observation 1. Given a set of sequences $D$, and a Markov model $M=(X,A, \bullet, \bullet)$ for which only the states are pre-specified, the optimal score of the minus log-likelihood function is given by $$S_L^*(\mathcal{D} \mid \mathcal{M}) = -\sum_{x,y \in X} c_{xy} \log \frac{c_{xy}}{c_x} - \sum_{\alpha \in \Sigma} c_\alpha \log \frac{c_\alpha}{c_{x(\alpha)}} \quad (4)$$

where $c_\alpha$, $c_x$ and $c_{xy}$ are as defined above.

The next question is to find the model that yields the highest likelihood for a dataset. That is, among all possible mappings (partitions) of the symbol set $\Sigma$ to states, find the partition that gives a model $\mathcal{M}^*$ that minimizes the score in Equation (4). This can be done as follows.

Lemma 2. The Markov model that minimizes Equation (4) is the "leaf-level" model with $|\Sigma|=m$ states $X=\{x_1, \ldots, x_m\}$, where $x_i=\{\alpha_i\}$.

Lemma 2 is a direct consequence of the following more general fact.

Lemma 3. Consider Markov models $M_1$ and $M_2$ for which for every state $x$ of $M_1$ and every state $y$ of $M_2$ it is either $A(x) \subseteq A(y)$ or $A(x) \cap A(y) = \emptyset$. In other words, the states of $M_1$ are a sub-partition of the states of $M_2$. Then $$S_L^*(\mathcal{D} \mid \mathcal{M}_1) \leq S_L^*(\mathcal{D} \mid \mathcal{M}_2)$$

Comparing the minus log-likelihood scores of the two models directly is not straightforward. Some terms of the difference are positive while other terms are negative, and it is not easy to compare them. Luckily tools provided by information theory can be used.

Intuitively, we want simple models with a small number of states, since such models are more useful to understand the data, and they avoid overfitting. However, as the previous Lemma shows, there is a trade-off between likelihood and simplicity of the model. A simpler problem to consider is finding the best model with a given number of states.

Problem 1 (k-state-optimal model). Given a set of sequences $\mathcal{D}=\{\sigma_1, \ldots, \sigma_r\}$ and a number k, find a Markov model $M$ that has at most k states and minimizes the score $S_L^*(\mathcal{D} \mid \mathcal{M})$.

However, the constraint of using k states might be too stringent and in many cases we may not know which is the correct number of states. We would like to have an objective function that balances the likelihood score and the number of states. This is a typical model selection problem, and many different approaches have been proposed, including minimum-description length (MDL) criteria, Bayesian information criterion (BIC), cross-validation methods, etc. BIC does not perform well for the size of the data contemplated. Essentially, for large data, the logarithmic factor of the BIC formula is orders of magnitude smaller than the minus log-likelihood score, and thus there is no sufficient penalization for model complexity.

Certain embodiments of the invention use a model-selection objective in which the minus log-likelihood and the model complexity are considered together. The task is to find the model that is as close as possible to a model with an ideal score. Finding the ideal-scoring model itself is not feasible in many cases due to the state space explosion problem. Instead, a number of candidate models are evaluated using a fitness function to find the closest fit within a limited number of resources (e.g., time, computing power, energy usage, etc). Let $\mathcal{M}_0$ be the model with the minimum possible number of states $s_{min}$ that achieves the maximum possible score $S_{L,max}^*$. Let $\mathcal{M}_{min}$ be the model with the maximum possible number of states $s_{max}=m$ that achieves the minimum possible score $S_{L,min}^*$. Then, for a model $M$ with $s$ states that achieves score $S_L^*=S_L^*(\mathcal{D} \mid \mathcal{M})$, the objective function is defined as $$Dist^2(\mathcal{M}) = \left(\frac{s - s_{min}}{s_{max} - s_{min}}\right)^2 + w \cdot \left(\frac{S_L^* - S_{L,min}^*}{S_{L,max}^* - S_{L,min}^*}\right)^2$$

The parameter w is a scale factor controlling the importance of the two terms of the objective function. Values of w such as 1 or 10 have been found to work in practice. The corresponding model-selection problem for the objective function can be restated as:

Problem 2. Given a set of sequences $\mathcal{D} = \{\sigma_1, \ldots, \sigma_r\}$, find a Markov model M that minimizes the objective $Dist^2(\mathcal{M})$.

In some instances, limiting the number of states may be desirable. A hybrid objective function combining an upper bound on a desirable number of states with minimizing the objective $Dist^2(\mathcal{M})$ may be stated as:

Problem 3. Given a set of sequences $\mathcal{D} = \{\sigma_1, \ldots, \sigma_r\}$ and a number k, find a Markov model M that has at most k states and minimizes the score $Dist^2(\mathcal{M})$.

Figure 2:
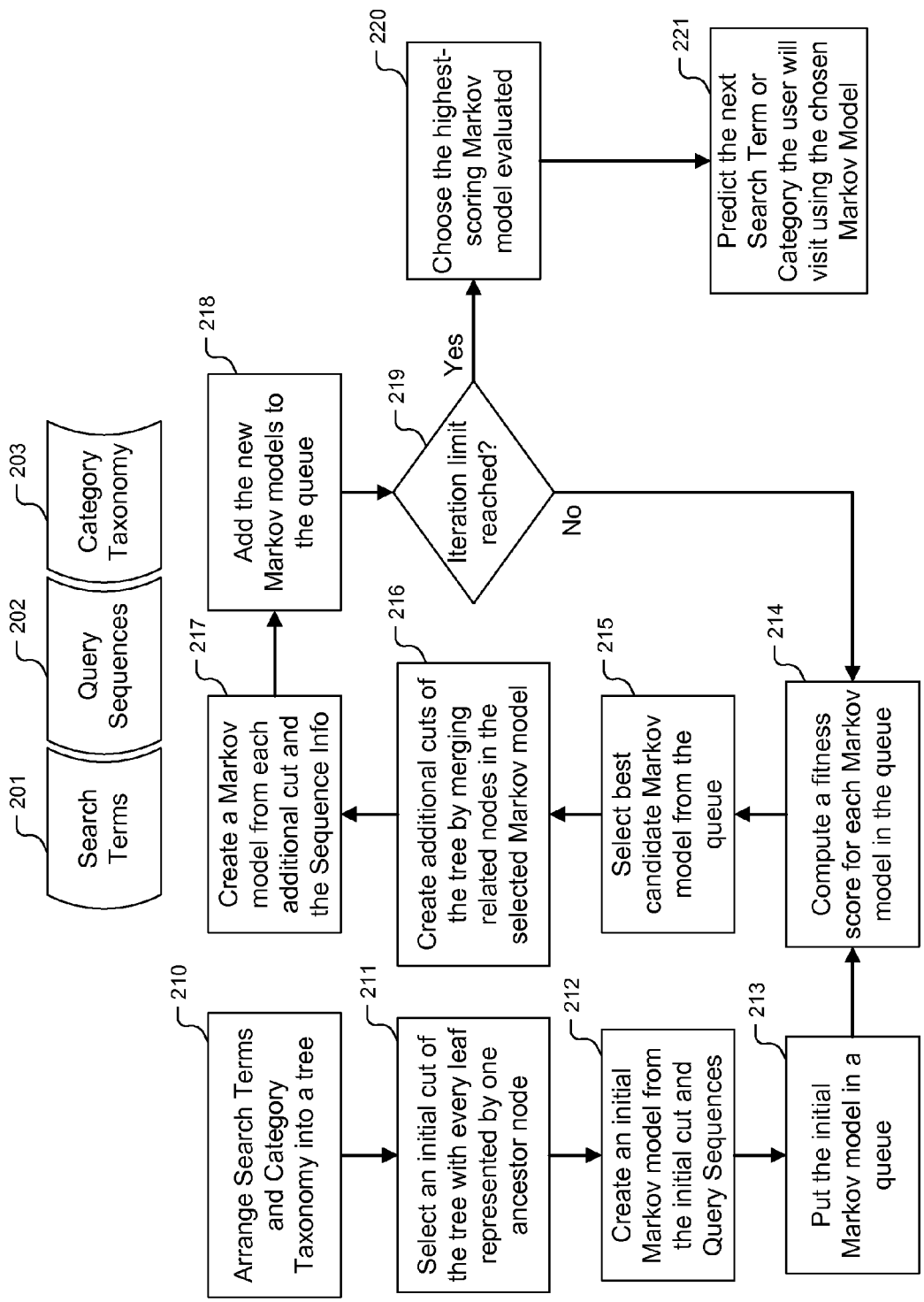
FIG. 2 presents a flowchart with an example process for practicing embodiments of the invention.

FIG. 2 presents a flowchart illustrating an example of a process implemented in accordance with a specific embodiment of the invention. The scenario of FIG. 1 is assumed, i.e., modeling a collection of search terms 201 and search query sequences 202 within a taxonomy of categories 203. Reference to elements of FIG. 2 will be made throughout the following general description. Some elements are simplified or omitted in FIG. 2 for clarity.

A method for modeling sequences of symbols (or events, or other data) on a computer with a Markov model takes as input a hierarchy T on the symbol set Σ and a set of sequences of elements from Σ (corresponding to data elements 201-203 of FIG. 2). The method uses a "bottom-up" search algorithm with the following components: (i) an objective function g; (ii) a fitness policy p; (iii) a priority queue Q of candidate models to evaluate; (iv) a set E of models already evaluated.

The objective function g may be drawn from any of a family of objective functions {g} defined as g: $\mathbb{R} \times \mathbb{N} \to \mathbb{R}$, where the first argument represents a minus log likelihood score and the second argument represents the number of states of a model. For illustrative purposes, the objectives functions used as examples herein are the ones defined in Problems 1, 2, and 3. For Problems 1 and 3, if a model has more than k states then g returns the value ∞. Numerous other functions for g are possible, as appreciated by those skilled in the art.

The fitness policy p is a total ordering on pairs (v, s) in $\mathbb{R} \times \mathbb{N}$, where again v represents a minus log likelihood score and s represents the number of states of a model. Let $M_i$ and $M_j$ be two models to be compared respectively with scores $v_i$, $v_j$ and $s_i$, $s_j$ states. For example, the three following fitness policies could be used.

(i) ProbabilityFirst: $p(v_i, s_i) > p(v_j, s_j)$ if and only if $v_i < v_j$ or ($v_i = v_j$ and $s_i < s_j$);

(ii) StatesFirst: $p(v_i, s_i) > p(v_j, s_j)$ if and only if $s_i < s_j$ or ($s_i = s_j$ and $v_i < v_j$);

(iii) DistSqFirst: $p(v_i, s_i) > p(v_j, s_j)$ if and only if $g(v_i, s_i) < g(v_j, s_j)$.

In the first case, the policy favors the likelihood minimization with respect to the complexity of the model. The converse is done in the second case. In the last case, the policy balances the likelihood score and the number of states by selecting the model that minimizes the objective function g. Limitless other fitness policies will be readily apparent to those skilled in the art.

The method initially puts in the queue Q the "leaf-level" model (213), i.e., the model with states X={$x_1, \ldots, x_m$}, where $x_i = \{\alpha_i\}$. This is the model composed of states corresponding to each symbol in Σ, with no higher level (non-leaf) nodes from the taxonomy (212). Starting from this model, the method iteratively searches for other models which yield better results according to the fitness policy.

A maximum number of iterations are defined corresponding to the amount of resources to be invested in creating the model (219). These resources may comprise a period of time to run computations, a number of computing cycles, an amount of processing power or energy to use, or any other resource constraints as appreciated by those skilled in the art.

In each iteration (214-218), as long as the queue Q is not empty and the maximum number of iterations has not been reached (219), the model M with the best score (214) according to the policy p is removed from the queue (215). The log-likelihood $v = S_L^*(\mathcal{D} | \mathcal{M})$ is evaluated for M, and the number of states of M is assigned to s. The model M is inserted in the set ϵ of evaluated models, along with the score g(v, s).

In addition, all models $M_i$ that result from M with one merging step according to the hierarchy T are generated (217). A state-merging step is performed by merging the children (immediate descendants) of a single node x in T to x (216). If $M_i$ has not already been evaluated (check in ϵ), then $M_i$ is put in the queue of candidates Q (218), according to the ordering p(v, s).

When the algorithm terminates, it returns the model with the best score g (220), among all models that have been evaluated and put in the set ϵ. How this model is used depends on the context. For example, in the context of FIG. 2 the model may be used to predict the next category a user will visit (221). This information can be used for a variety of purposes, including the aforementioned example of selecting advertisements to display for the user.

In some embodiments, each candidate model is inserted in Q with the minus log likelihood score of its parent, which is a lower bound on its own score. This optimization is faster than computing the likelihood score of each candidate. It should also be noted that queue Q is merely a convenient technique for describing the process. Q can be implemented with many different data structures other than queues, and the process can be structured in numerous other ways without Q to achieve the same result.

Figure 3:
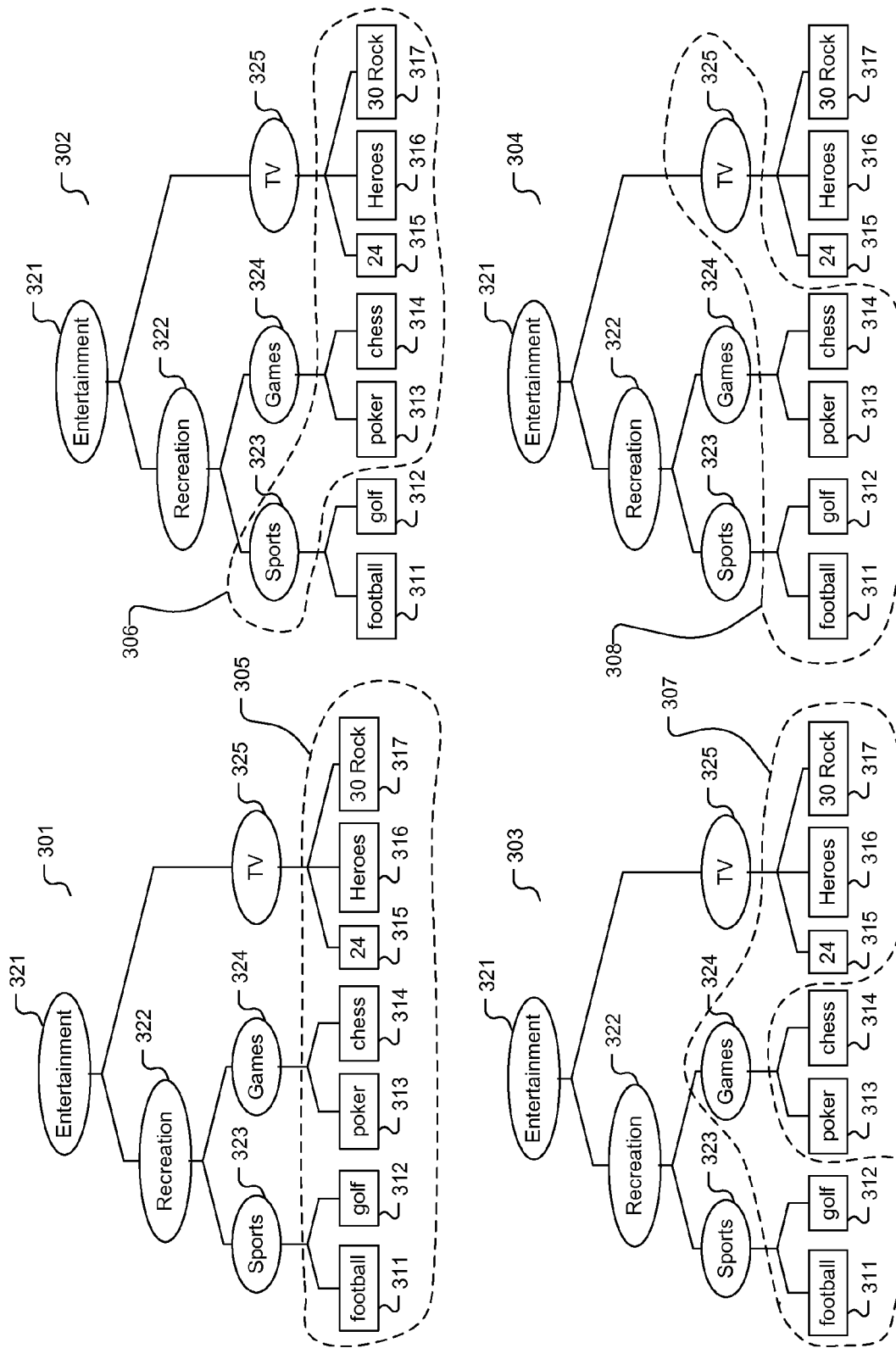
FIG. 3 illustrates a particular embodiment of merging adjacent nodes to create new model candidates.

FIG. 3 illustrates a particular embodiment of merging adjacent nodes to create new model candidates. Tree 301 depicts the leaf-level model or "cut" 305 used as the initial model in certain embodiments of the invention. Nodes 311-311—the leaves of the tree, representing search terms entered by a user—are selected for this cut. A Markov model is then constructed using those nodes as states. This corresponds to the first candidate Markov model evaluated. Other candidates are generated from tree 301 according to the described state-merging algorithm. Each set of adjacent (sibling) nodes in cut 305 is merged into their parent node to create another cut of the tree.

Tree 302 shows the cut 306 formed by merging nodes football 311 and golf 312 into their parent node Sports 323. The other nodes in cut 306 are inherited from cut 305, that is, nodes 313-317. Cut 306 thus consists of nodes 323 and 313-317. Similarly, cut 307 merges sibling nodes poker 313 and chess 314 into the parent node Games 324, creating a cut consisting of nodes 311-312, 324, and 315-317. Finally, cut 308 merges the nodes under TV 325 to create a cut comprising nodes 311-314 and 325. Thus cuts 306-308 represent the three possible cuts formed by a single state-merging operation on cut 305. Each cut 306-308 may be used to create a candidate Markov model for the next iteration.

Further cuts are not possible with a single merge operation. For example, the nearest common ancestor of golf 312 and poker 313 is the category Recreation 322. But Recreation is not the parent node of either golf or poker; Recreation is a more distant ancestor, separated from golf and poker by the intervening nodes Sports 323 and Games 324. The cut combining golf and poker thus requires three merge operations to reach from cut 305: one merge of football and golf into Sports, another merge of poker and chess into Games, and a third merge of Sports and Games into Recreation. Embodiments using the single-merge rule to identify cuts based on cut 305 would not consider this cut.

However, the same cut may be reached within these rules through other paths. For example, a cut comprising nodes Recreation 322 and TV 325 may be created by a single merge operation on a cut comprising nodes Sports 323, Games 324, and TV 325. Other embodiments which do not employ a one-merge rule may perform such merges directly from the leaf-level cut 305 or other cuts. Whether these cuts are actually reached during operation of an embodiment depends on how many iterations are performed and the fitness measures of preceding cuts along the path from the starting cut.

Without the constraint imposed by the taxonomy, the search space of the method would be the set of all possible partitions of the symbol set $\Sigma$, which is exponentially large. Performing merges only along the hierarchy of nodes reduces the search space dramatically. Nevertheless, even with the use of a hierarchy, the search space has exponential size. In practice, it is impossible to explore it completely for all but toy-size datasets. Finding a good solution depends mostly on using a fitness policy that allows reaching a good solution fast. Assuming a given fitness policy, being able to evaluate candidate models fast is also very important, so that a large quantity of candidate models can be evaluated per unit of time.

The costly part of evaluating the objective function of a model is computing the $S_L^*$ score. For computing $S_L^*$, only the counts $c_\alpha$ and $c_{\alpha\beta}$ are needed. So the input dataset D only has to be read once, all the information in the counts $c_\alpha$ and $c_{\alpha\beta}$ summarized, and then all evaluation using those counts performed. In fact, assuming a sparse representation of the matrix $c_{\alpha\beta}$, its density cannot be higher than $n/m^2$, where n is the cumulative length of all sequences and m is the size of the symbol set $\Sigma$. The amount of space (and time) needed for the evaluation of each model is $O(\min\{n, m^2\})$.

A faster model evaluation can be done incrementally, by computing the score of a model with respect to the $S_L^*$ score of its "parent" model, which has already been evaluated as a by-product of our bottom-up algorithm. In particular, consider a model $M_1$ with state space X, and a child model $M_2$ which is built from $M_1$ by merging a subset of d states of $M_1$ into a single state in $M_2$. Observation 1 allows the difference in the $S_L^*$ score of the two models to be expressed in terms only of the counters $c_{xy}$ that involve the states x, y participating in the merging, without computing over the whole frequency matrix c. The evaluation of each child model can be done in time $O(\min\{n, md\})$ given that the score of the parent node is known.

The method can be extended in accordance with specific embodiments of the invention to identify clusters of sequences. A cluster in this context is a subset of sequences with similar characteristics. Creating separate models for each cluster may yield better results with higher predictive value. For example, suppose the sequence data represents search queries as illustrated in FIG. 1. Students using the search engine may commonly search for tv shows and games such as the examples given. Meanwhile, working professionals may often search for tv shows and sports. Combining sequence data from both groups lowers the predictive value of the model. The next likely category from a user searching for tv shows may vary greatly depending on which cluster the user belongs to. Students may be more likely to search for games while professionals are more likely to search for sports. Identifying distinct clusters of users and creating separate Markov models for each improves results. If the user can be assigned to either the student or professional cluster, his subsequent searches can be predicted with higher accuracy.

However, the problem faced is that these clusters are not known in advance. Given only sequences of events, identifying clusters within the sequences is a difficult problem. How many clusters should be created? What criteria should separate the clusters? For example, are the searches of retirees more similar to students or professionals? Or do they belong in their own cluster?

According to various embodiments, different techniques for identifying clusters may be used. For example, a standard Expectation-Maximization (EM) cluster identification technique can be used, in which each cluster is modeled using the Markov modeling methods described herein. Combining these techniques and methods yields a process for more accurately modeling users who fit within distinct groups.

Let k be the number of clusters we want to obtain; the clustering will be a partition of the sequences D into k sets $D_1, D_2, \ldots, D_k$. To initialize the method, an initial partition is done. For example, a random initial assignment can be performed, but other initialization procedures can also be used. The method then proceeds iteratively. On each iteration: first, using the method previously described in this section, the model $\mathcal{M}_i^*$ that maximizes $$\mathcal{M}_i^* = \operatorname*{argmax}_{\mathcal{M}} S_L(\mathcal{D}_i \mid \mathcal{M})$$

is found for each subset $D_i$. Next, the whole set of sequences $\mathcal{D} = \{\sigma_1, \ldots, \sigma_r\}$ is scanned. For each sequence $\sigma_j$, the index $k_j^*$ that maximizes the likelihood of that particular sequence is found by $$k_j^* = \operatorname*{argmax}_{k_j \in \{1, 2, \ldots, k\}} S_L(\{\sigma_j\} \mid \mathcal{M}_{k_j}^*)$$

Finally, the sequences are re-partitioned such that sequence $\sigma_j \in \mathcal{D}_{k_j}^*$. Each sequence is reassigned to the partition whose model gives the maximum likelihood for that sequence. The process stops when the fraction of elements reassigned becomes negligible.

The model inference phase in each iteration is faster than the one using HMMs given the absence of hidden states. Also, in the evaluation phase for each sequence $\sigma$, one Viterbi evaluation having cost $m^2|\sigma|$ where m is the number of states, is turned into a simple summation of $2|\sigma|$ terms (one for the transition and one for the emission probability).

Figure 4:
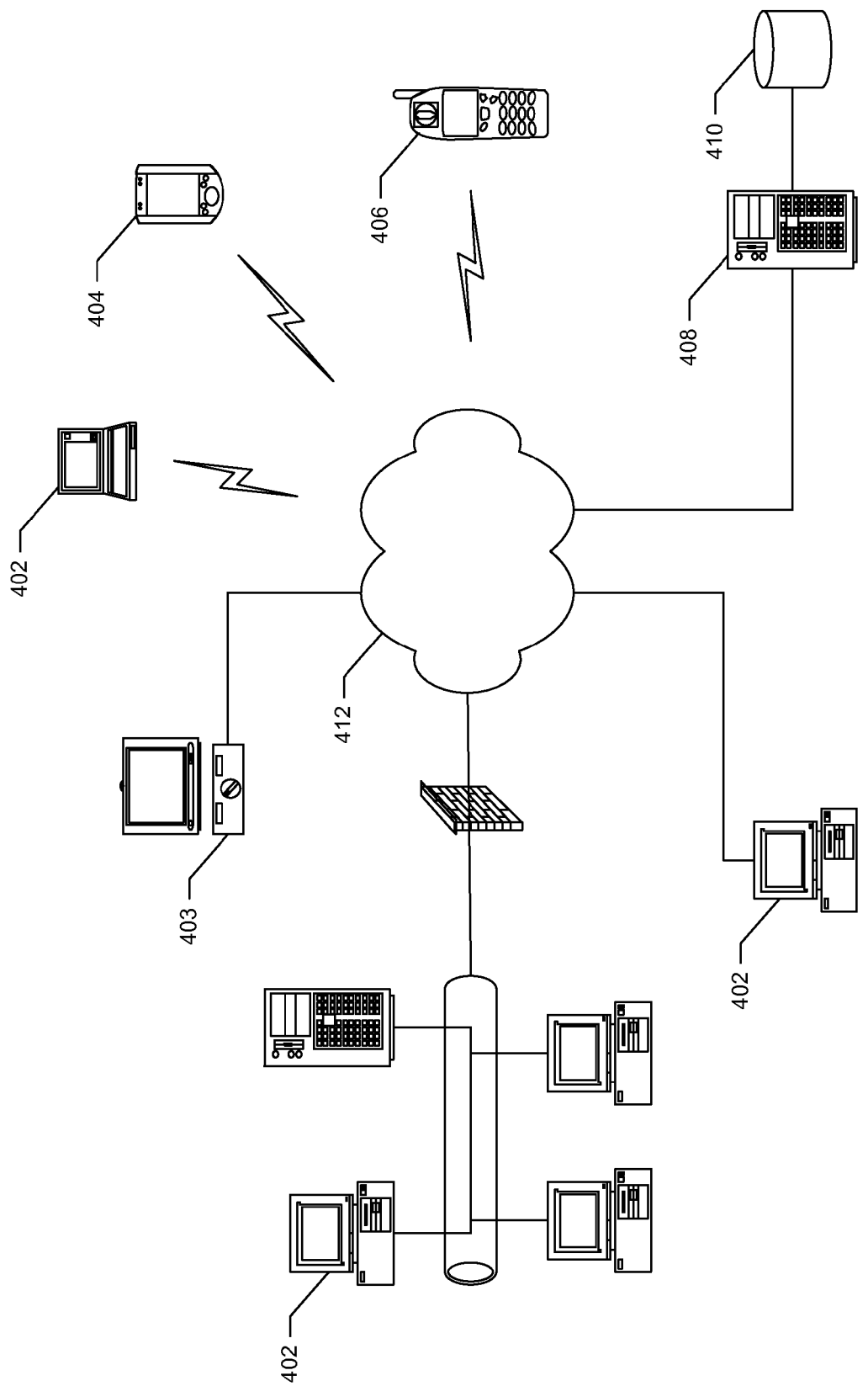
FIG. 4 is a simplified diagram of a computing environment in which embodiments of the present invention may be implemented.

Embodiments of the present invention may be employed to model data in any of a wide variety of computing contexts. For example, as illustrated in FIG. 4, implementations are contemplated in which the relevant population of users interact with a diverse network environment via any type of computer (e.g., desktop, laptop, tablet, etc.) 402, media computing platforms 403 (e.g., cable and satellite set top boxes and digital video recorders), handheld computing devices (e.g., PDAs) 404, cell phones 406, or any other type of computing or communication platform.

And according to various embodiments, user data processed in accordance with the invention may be collected using a wide variety of techniques. For example, collection of data representing a user's interaction with a web site or web-based application or service (e.g., search queries, links selected, the number of page views, etc.) may be accomplished using any of a variety of well known mechanisms for recording a user's online behavior. User data may be mined directly or indirectly, or inferred from data sets associated with any network or communication system on the Internet. And notwithstanding these examples, it should be understood that such methods of data collection are merely exemplary and that user data may be collected in many ways.

Once collected, the user data may be processed in some centralized manner. This is represented in FIG. 4 by server 408 and data store 410 which, as will be understood, may correspond to multiple distributed devices and data stores. The invention may also be practiced in a wide variety of network environments including, for example, TCP/IP-based networks, telecommunications networks, wireless networks, etc. These networks, as well as the various social networking sites and communication systems from which connection data may be aggregated according to the invention are represented by network 412.

In addition, the computer program instructions with which embodiments of the invention are implemented may be stored in any of a wide variety of computer-readable storage media or memory, and may be executed according to a variety of computing models including a client/server model, a peer-to-peer model, on a stand-alone computing device, or according to a distributed computing model in which various of the functionalities described herein may be effected or employed at different locations and/or different computing platforms.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer implemented method for modeling event data using a pre-existing taxonomy of events, the event data representing a plurality of sequences of events, each sequence comprising an order of events initiated by a corresponding user, each event mapping to a leaf node of the taxonomy, the method comprising:

identifying a plurality of candidate Markov models, each Markov model representing probabilities of a user transitioning from any first node in the Markov model to any second node in the Markov model according to the sequences of events, each Markov model formed from a subset of nodes in the taxonomy by merging selected nodes of the taxonomy into corresponding ancestor nodes of the taxonomy, wherein each event is represented by a node in each Markov model, and further wherein no Markov model contains both a particular node and an ancestor of that particular node;

measuring the fitness of the candidate Markov models with a fitness policy;

selecting at least some of the plurality of candidate Markov models with reference to the fitness measure and one or more resource constraints; and choosing a preferred Markov model from the selected candidate Markov models with reference to an objective function.

2. The method of claim 1, wherein the objective function balances a likelihood score of each selected candidate Markov model with a number of states corresponding to the model.

3. The method of claim 2, wherein the objective function comprises the relation $$Dist^2(\mathcal{M}) = \left(\frac{s - s_{min}}{s_{max} - s_{min}}\right)^2 + w \cdot \left(\frac{S_L^* - S_{L,min}^*}{S_{L,max}^* - S_{L,min}^*}\right)^2,$$

wherein s is the number of states in a candidate Markov model $\mathcal{M}$ with likelihood score $S_L^*$, $s_{min}$ is a minimum possible number of states in a Markov model achieving a maximum possible likelihood score $S_{L,max}^*$, $s_{max}$ is a maximum possible number of states in a Markov model achieving a minimum possible likelihood score $S_{L,min}^*$, and w is a scaling factor.

4. The method of claim 1, further comprising partitioning the event data into multiple clusters, each cluster yielding a preferred Markov Model, and iteratively adjusting the clusters by reassigning each event sequence to the cluster whose preferred Markov Model maximizes the objective function for that sequence.

5. The method of claim 1 wherein selecting at least some of the candidate Markov models with reference to the fitness measure comprises selecting each selected candidate Markov model according to one of (i) a likelihood score of the selected candidate Markov model, (ii) a minimal number of nodes in the selected candidate Markov model, or (iii) an objective function score on the selected candidate Markov model.

6. The method of claim 1, further comprising displaying advertisements for a user based on a probability represented by the preferred Markov model.

7. The method of claim 1 wherein the event data comprises one of (i) search queries submitted to a search engine, (ii) purchases on an online commerce site, (iii) locations on a map, (iv) pages visited on one or more websites, or (v) user interactions with a software system.

8. A system for modeling event data using a pre-existing taxonomy of events, the event data representing a plurality of sequences of events, each sequence comprising an order of events initiated by a corresponding user, each event mapping to a leaf node of the taxonomy, the system comprising one or more computing devices configured to:

identify a plurality of candidate Markov models representing the probabilities of a user transitioning from any first node in the model to any second node in the model according to the sequences of events, each Markov model formed from a subset of nodes in the taxonomy by merging selected nodes of the taxonomy into corresponding ancestor nodes of the taxonomy, wherein each event is represented by a node in each Markov model, further wherein no Markov model contains both a particular node and an ancestor of that particular node;

measure the fitness of the candidate Markov models with a fitness policy;

select at least some of the plurality of candidate Markov models with reference to the fitness measure and one or more resource constraints; and choose a preferred Markov model from the selected candidate Markov models with reference to an objective function.

9. The system of claim 8, wherein the objective function balances a likelihood score of each selected candidate Markov model with a number of states corresponding to the model.

10. The system of claim 9, wherein the objective function comprises the relation $$Dist^2(\mathcal{M}) = \left(\frac{s - s_{min}}{s_{max} - s_{min}}\right)^2 + w \cdot \left(\frac{S_L^* - S_{L,min}^*}{S_{L,max}^* - S_{L,min}^*}\right)^2,$$

wherein s is the number of states in a candidate Markov model $\mathcal{M}$ with likelihood score $S_L^*$, $s_{min}$ is a minimum possible number of states in a Markov model achieving a maximum possible likelihood score $S_{L,max}^*$, $s_{max}$ is a maximum possible number of states in a Markov model achieving a minimum possible likelihood score $S_{L,min}^*$, and w is a scaling factor.

11. The system of claim 8, wherein the one or more computing devices are further configured to partition the event data into multiple clusters, each cluster yielding a preferred Markov Model, and iteratively adjust the clusters by reassigning each event sequence to the cluster whose preferred Markov Model maximizes the objective function for that sequence.

12. The system of claim 8 wherein the one or more computing devices are configured to select at least some of the candidate Markov models with reference to the fitness measure by selecting each selected candidate Markov model according to one of (i) a likelihood score of the selected candidate Markov model, (ii) a minimal number of nodes in the selected candidate Markov model, or (iii) an objective function score on the selected candidate Markov model.

13. The system of claim 8, wherein the one or more computing devices are further configured to display advertisements for a user based on a probability represented by the preferred Markov model.

14. The system of claim 8 wherein the event data comprises one of (i) search queries submitted to a search engine, (ii) purchases on an online commerce site, (iii) locations on a map, (iv) pages visited on one or more websites, or (v) user interactions with a software system.

15. A computer program product for modeling event data using a pre-existing taxonomy of events, the event data representing a plurality of sequences of events, each sequence comprising an order of events initiated by a corresponding user, each event mapping to a leaf node of the taxonomy, comprising at least one non-transitory computer-readable medium having computer instructions stored therein which are configured to cause one or more computing devices to:

identify a plurality of candidate Markov models representing the probabilities of a user transitioning from any first node in the model to any second node in the model according to the sequences of events, each Markov model formed from a subset of nodes in the taxonomy by merging selected nodes of the taxonomy into corresponding ancestor nodes of the taxonomy, wherein each event is represented by a node in each Markov model, further wherein no Markov model contains both a particular node and an ancestor of that particular node;

measure the fitness of the candidate Markov models with a fitness policy;

select at least some of the plurality of candidate Markov models with reference to the fitness measure and one or more resource constraints; and choose a preferred Markov model from the selected candidate Markov models with reference to an objective function.

16. The computer program product of claim 15, wherein the objective function balances a likelihood score of each selected candidate Markov model with a number of states corresponding to the model.

17. The system of claim 16, wherein the objective function comprises the relation $$Dist^2(\mathcal{M}) = \left(\frac{s - s_{min}}{s_{max} - s_{min}}\right)^2 + w \cdot \left(\frac{S_L^* - S_{L,min}^*}{S_{L,max}^* - S_{L,min}^*}\right)^2,$$

wherein s is the number of states in a candidate Markov model $\mathcal{M}$ with likelihood score $S_L^*$, $s_{min}$ is a minimum possible number of states in a Markov model achieving a maximum possible likelihood score $S_{L,max}^*$, $s_{max}$ is a maximum possible number of states in a Markov model achieving a minimum possible likelihood score $S_{L,min}^*$, and w is a scaling factor.

18. The computer program product of claim 15, wherein the computer instructions are further configured to cause the one or more computing devices to partition the event data into multiple clusters, each cluster yielding a preferred Markov Model, and iteratively adjust the clusters by reassigning each event sequence to the cluster whose preferred Markov Model maximizes the objective function for that sequence.

19. The computer program product of claim 15 wherein the computer instructions are further configured to cause the one or more computing devices to select at least some of the candidate Markov models with reference to the fitness measure by selecting each selected candidate Markov model according to one of (i) a likelihood score of the selected candidate Markov model, (ii) a minimal number of nodes in the selected candidate Markov model, or (iii) an objective function score on the selected candidate Markov model.

20. The computer program product of claim 15 wherein the event data comprises one of (i) search queries submitted to a search engine, (ii) purchases on an online commerce site, (iii) locations or visited or trajectories taken on a map, (iv) pages visited on a website, or (v) user interactions with a software system or user interface.

* * * * *